United States Patent [19]

Blewett

[11] Patent Number: 5,551,040
[45] Date of Patent: Aug. 27, 1996

[54] METHODS AND APPARATUS FOR SPECIFYING THE CONTEXTS OF NAMES IN CALLBACK-STYLE PROGRAMMING

[75] Inventor: Charles D. Blewett, Madison, N.J.

[73] Assignee: Lucent Technologies Inc., Murray Hill, N.J.

[21] Appl. No.: 369,976

[22] Filed: Jan. 9, 1995

Related U.S. Application Data

[63] Continuation of Ser. No. 71,144, Jun. 2, 1993, abandoned.

[51] Int. Cl.$^6$ .................................................. G06F 9/45
[52] U.S. Cl. ..................... 395/700; 395/155; 395/375; 395/600; 395/650
[58] Field of Search .................................. 395/375, 650, 395/700, 600, 155

[56] References Cited

U.S. PATENT DOCUMENTS

| | | | |
|---|---|---|---|
| 4,949,255 | 8/1990 | Gerth et al. | 395/700 |
| 5,093,916 | 3/1992 | Karp et al. | 395/700 |
| 5,146,593 | 9/1992 | Brandle et al. | 395/700 |
| 5,146,594 | 9/1992 | Iitsuka | 395/700 |
| 5,175,854 | 12/1992 | Cheung et al. | 395/650 |
| 5,187,787 | 2/1993 | Skeen et al. | 395/600 |
| 5,230,072 | 7/1993 | Smith et al. | 395/600 |
| 5,237,662 | 8/1993 | Green et al. | 395/650 |
| 5,247,693 | 9/1993 | Bristol | 395/800 |
| 5,280,617 | 1/1994 | Brender et al. | 395/700 |
| 5,381,550 | 1/1995 | Jourdenais et al. | 395/700 |
| 5,428,793 | 6/1995 | Odnert et al. | 395/700 |
| 5,475,843 | 12/1995 | Halviatti et al. | 395/700 |

OTHER PUBLICATIONS

D. Blewett, S. Anderson, M. Kilduff, S. Udovic, M. Wish, "X* Widget Based Software Tools for UNIX**", Proceedings of the Winter, 1992 USENIX Conference, pp. 111–123.
P. J. Asente and R. W. Swick, X Window System Toolkit, The Complete Programmer's Guide and Specification, Digital Equipment Corporation, 1990, Chapters 3 and 6.

*Primary Examiner*—Ken S. Kim
*Attorney, Agent, or Firm*—Gordon E. Nelson

[57] ABSTRACT

Apparatus and methods for specifying contexts for machine-executable instructions. Modern graphical user interface systems employ the callback programming style. In this style, a system event handler responds to an event by executing application-level callback code and providing event information concerning the event as part of the context of the execution. The technique disclosed herein uses callback information names to specify the relationship between the event information and the execution context. The callback information names are defined globally, but represent the event information for a single execution of the callback code. Using the callback information names, it is possible to define the callback code in the function which adds the callback code to the graphical user interface system.

10 Claims, 1 Drawing Sheet

5,551,040

METHODS AND APPARATUS FOR SPECIFYING THE CONTEXTS OF NAMES IN CALLBACK-STYLE PROGRAMMING

This application is a continuation application Ser. No. 08/071,144, filed on Jun. 2, 1993 now abandoned.

BACKGROUND OF THE INVENTION

1. Field of the Invention

The invention concerns programming generally and is more specifically directed to techniques for defining a context in which code that is invoked in response to an asynchronous event is executed.

2. Description of the Prior Art

When a computer executes a program, it uses data and code stored in the computer's memory system. When writing a program, a programmer uses names to specify the code and the data. When the program is executed on the computer, the execution of the program provides a context for the names. What the names mean in a given execution depends on the context for that execution. In the prior art, the context for a given part of a program has been defined by means of declarations for names of variables and procedures and functions and of invocations of procedures and functions. The following pseudo-code fragment, which shows parts of two procedures, a and b provides an example of such context definition:

```
int static_1 global
    .
    .
    .
main a
    int a_auto_1, a_auto_2
    .
    .
    .
    b(a_auto_1,a_auto_2)
    .
    .
    .
int b ( int form_1, form_2 )
    int b_auto
    .
    .
    .
    static_1 = form_1 + form_2 + b_auto
    .
    .
    .
```

There are six names of interest in the above fragment: static_1, a_auto_1, a_auto_2, form_1, form_2, and b_auto. static_1 is the name of a global static variable. The name of the variable is known everywhere in the program containing the functions a and b. static_1 further represents only a single location in the memory of the computer upon which the program is executing. Thus, static_1 always represents the current value of that location. a_auto_1, a_auto_2, and b_auto are names of automatic variables. The name of each of these variables is known only within the function where it is declared and each name further represents a given location in memory only during a given execution of the function in which the variable is declared. Consequently, a change in the value of one of these variables during one execution of the function has no effect whatever on its value during a different execution.

form_1 and form_2 are names of formal arguments. These names are known only within the function where they are declared. In that function, they represent values which the function receives as actual arguments when it is executed. For example, in the code fragment above, the function b is invoked as follows:

b(a_auto_1,a_auto_2)

In this invocation, a_auto_1 and a_auto_2 are actual arguments. When the invocation is executed, the function b is executed, and during that execution, form_1 represents the value of a_auto_1 and form_2 represents the value of a_auto_2.

The context of a given execution of the function b is thus the global static variable static_1, the values of the actual arguments a_auto_1 and a_auto_2 (that is to say, the values of these automatic variables at the time of execution), and the automatic variable b_auto.

FIG. 1 shows a standard way of implementing a context 101 in the memory of a computer system. In most computer systems, programs are executed by processes, and each process has a process address space, that is, each process appears to have a memory which is separate from that of any other process running in the computer system. One part 103 of the process address space contains storage for static variables, including static_1; another part contains storage for the process's stack 109. There is an area on the stack for each execution of a function in the program which has not yet terminated. This area, which is called a frame 115, contains storage for the actual arguments used in an invocation and the automatic variables created in the invocation. Stack 109 in FIG. 1 is shown at a point where the function a has just invoked the function b. Only the top two frames, 111 and 115, are shown. Frame pointer (FP) 113 marks the beginning of the top frame 115. In frame 111 only the storage for a's two automatic variables is shown. In frame 115, there is storage 121 and 123 for the values of a_auto_1 and a_auto_2 at the time of the invocation of b, and storage for b's automatic variable b_auto 125. The order of a_auto_1_val 121 and a_auto_2_val 123 in frame 115 is determined by the order of the actual arguments in the invocation of function b.

As the foregoing example has made clear, specification of a context for code is straightforward in situations where there is a direct relationship between the code being invoked and the code containing the invocation. More and more frequently, however, there is no such direct relationship. One example of a programming style in which there is no direct relationship is a style called callback programming. FIG. 2 shows a system 201 in which callback programming is employed. Such systems are typically used to write programs for interactive environments such as graphical user interfaces. In system 201, a hardware device (in this case, a mouse 203) produces a signal 204 which is received by a system-level event handler 205, which is a standard part of system 201. The signal may be produced when the user moves the mouse and thereby moves a pointer in a display or when the user depresses or releases a button on the mouse. System-level event handler 205 responds to signal 204 by providing callback information 211 and then invoking application-level callback code 213 using callback information 211 as actual arguments in the invocation, as indicated by arrow 209.

In some graphical user interface environments, windows in a display are represented by objects termed "widgets", and when system-level event handler 205 responds to signal 204, it determines from the location of the pointer in the display what window in the display the pointer is in and accordingly what widget represents the window. In such an environment, callback information 211 contains at least a pointer to the widget and a value indicating the signal 204 which caused the callback, and callback code 213 typically responds to the callback by setting values in the widget as required to deal with the signal.

In systems like system 201, the system-level handler 205 is developed by systems programmers and provided to applications programmers, who then write the application-level callback code 213 required for their particular application. As far as the applications programmers are concerned, system-level event handler 205 is a "black box", and of course the systems programmers who developed event handler 205 can have no idea whatever of the specific callback code 213 which will be written by the applications programmers. Because this is the case, system 201 must include a mechanism which permits applications programmers to add call back code 213 to system 201 without changing handler 205.

The mechanism for doing this is callback code table 207 and callback information 211. The form and contents of callback information 211 and callback code table 207 are both completely defined for system 201. The applications programmer must understand the contents of callback information 211 when he or she writes callback code 213, and when callback code 213 is finished, the applications programmer must add an entry for callback code 213 to table 207. In the graphical user interface environment, the entry specifies at least the widget for which the function handles signals and the kinds of signals the function deals with. One simple way of handling callback information 211 is to push it onto the stack prior to invoking callback code 213. The callback information thus occupies the location in the frame for the callback code which would be normally occupied by the actual arguments, and the application programmer need only define formal arguments in the callback code in accordance with the contents and arrangement of callback information 211.

While prior-art systems using the callback programming style are effective, programmers using them have missed the clear specification of the context provided by standard programming languages. The chief source of difficulty has been the lack of any way of specifying actual arguments in callback programming. One consequence of this lack has been frequent mistakes in relating the formal arguments of the callback code to the format of callback information 211; another has been that the callback code and the installation of the code into the system are at different locations, leading to increased difficulty in understanding the code for the application. It is an object of the present invention to overcome these drawbacks and thereby to make the callback programming style even more useful than it already is.

SUMMARY OF THE INVENTION

The invention provides a clear specification of the actual arguments which is independent of any direct invocation of the callback program. The specification is made using names which represent the contents of callback information 211. The names have global scope, that is, they can be used without declaration in any application-level callback code, but the values they represent in a given execution of the callback code are local in scope, that is, they are the values of callback information 211 provided by system level handler 205 for that execution of callback code 213. In a preferred embodiment, callback information 211 is placed on a process stack; consequently, executions of callback code may be nested. In the preferred embodiment, the names are defined by the system 201 in which the callback programming is done; in other embodiments, additional such names may be defined by applications programmers. The technique may further be used in areas other than callback programming.

The foregoing and other objects and advantages of the invention will be apparent to one of ordinary skill in the art who peruses the following Drawing and Detailed Description, wherein:

Figure 1:
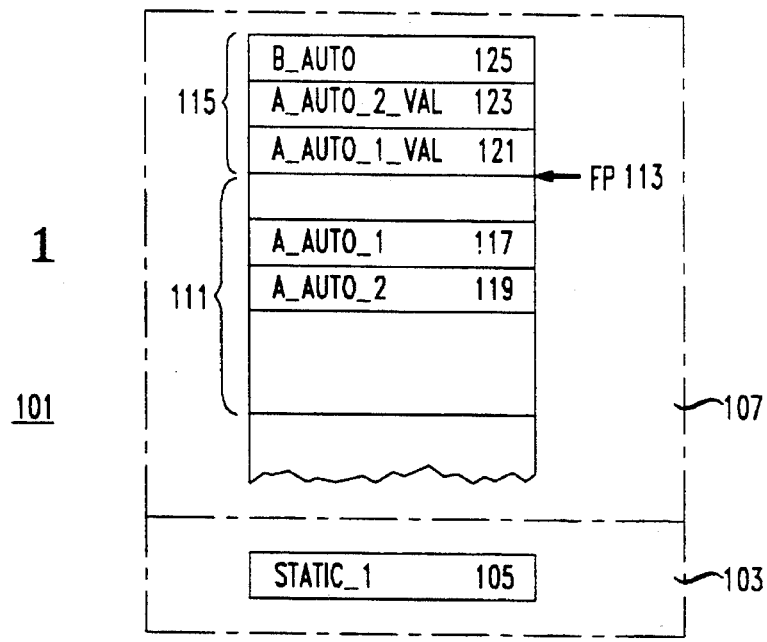
FIG. 1 shows a context for an execution of code.
Figure 2:
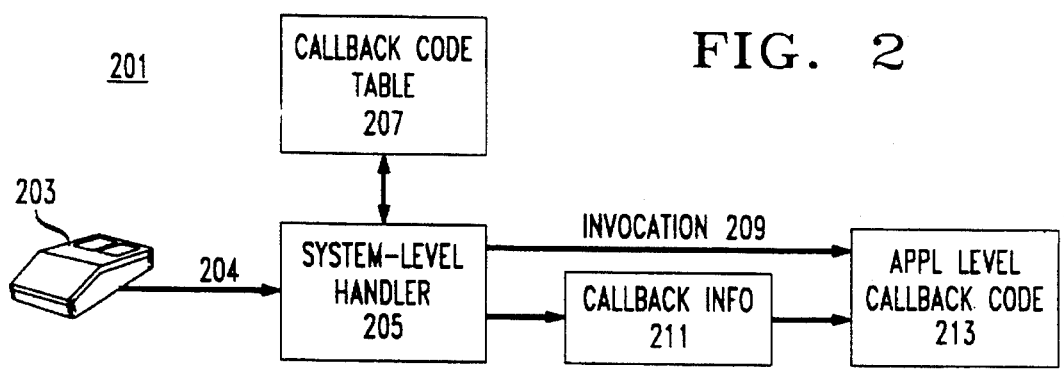
FIG. 2 shows an example system employing the callback programming style.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description will begin with an overview of the techniques employed in the present invention and then describe a preferred embodiment which is implemented in the Xtent system for specifying applications running on the X Window System™.

OVERVIEW OF THE INVENTION: FIG. 3

The solution to the problem of specifying the actual arguments in a system which employs callback programming involves two primary components:

Names for the contents of callback information 211 which have global scope but which represent values with local scope, that is, the values contained in callback information 211 for a specific execution of a callback function. These names are called hereinafter callback information names; and Syntax for an actual argument specifier which employs the callback information names but is not part of an actual invocation of the callback function.

The names and the syntax together permit the applications programmer to precisely specify the relationship between callback information 211 provided by the system and the formal arguments of the callback code.

Figure 3:
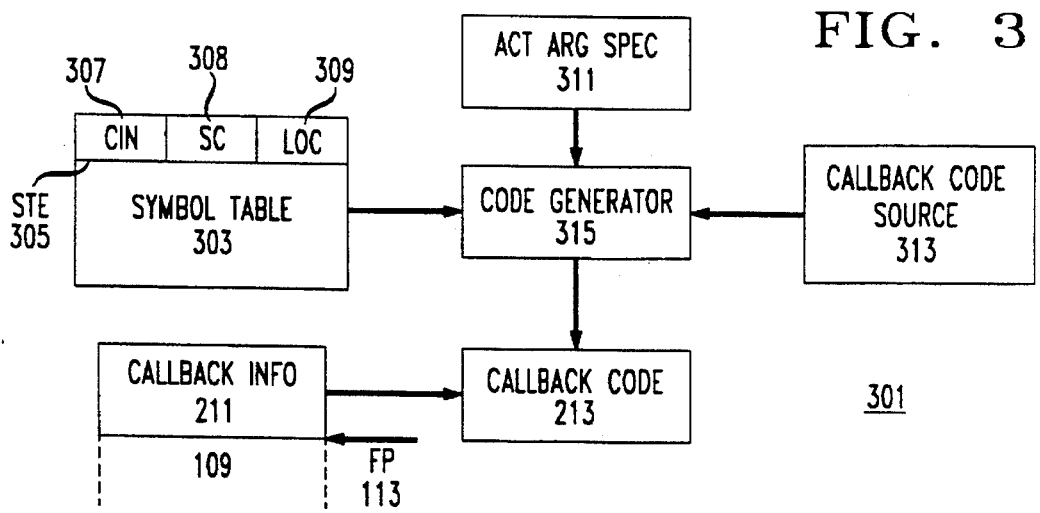
FIG. 3 provides an overview of the invention.

FIG. 3 provides an overview of a system 301 for generating callback code 213 using the techniques of the invention. In system 301, callback code 213 is generated by code generator 315. In some versions of system 301, code generator 213 may be an interpreter, that is, it may produce the code for callback code 213 as the code is executed; in other versions, code generator 213 may be a compiler, that is, it may produce the complete code for code generator 213 prior to execution of the code; in still other versions, compilation and interpretation may be combined.

Code generator 315 takes three inputs: callback source 313, which is the source code for callback code 213; actual argument specification 311, which uses callback information names to specify the actual arguments for an invocation of callback code 213 by system-level handler 205, and symbol table 303, which contains definitions of the names used in actual argument specification 311 and callback source 313. Each definition 305 includes the name being defined, the name's scope, and a description of the location in the process address space represented by the name. The location is generally specified as an offset from a pointer. The definition 305 shown in FIG. 3 is for a callback information name (CIN) 307; scope field 308 specifies a global scope, and location field 305 specifies an offset from frame pointer 113 for the stack frame 115 for the execution of callback code 213 which corresponds to the location in that stack frame of the callback information represented by the callback information name in callback information 211.

In response to the inputs, code generator 315 generates callback code 213 in which the names specified in actual argument specification 311 and callback source 313 have been properly related to the storage locations which make up the context of callback code 213 for a given execution. When callback code 213 is executed, it is able to correctly interpret the information contained in callback info 211 in stack frame 115 for the execution. An important advantage of placing callback info 211 in stack frame 115 is that execution of callback functions in callback code 213 may be nested; i.e., if another signal 204 occurs while a callback function is being executed, the current execution may be suspended and the execution of the callback function for the new signal 204 may be commenced in exactly the same fashion that invocation of one function by another suspends execution of the invoking function until execution of the invoked function is finished.

Embodiment of the Invention in Xtent

Xtent, which is described in detail in Blewett, D., Anderson, S., Kilduff, M., Udovic, S., Wish, M., "X Widget Based Software Tools for UNIX™," in *Proceedings of the Winter, 1992 USENIX Conference*, pp. 111–123, is a system for specifying applications of the X Window System of making graphical user interfaces. Xtent employs its own specification language. The specifications may be executed directly by an interpreter which is part of the system. The Xtent system may further be used to specify and create widgets (the entities which represent a window in the display in the X Window System) and to handle inter-process communications from other processes in an X Window System.

Xtent itself uses the well-known X Toolkit™ environment for writing graphical user interfaces based on the X Window System. In the X Toolkit environment, the user provides callback code to handle a variety of occurrences detected by the X Window System. One group of such occurrences is a set of system-defined events. The callback code which deals with the events is termed an event handler. All event handlers must have formal arguments which match the following prototype:

void (*XtEventHandler) (Widget, XtPointer, XEvent*, Boolean*)

The names Wiget, XtPointer, XEvent*, Boolean* are the types of the formal arguments for the event handler. The formal argument with the Widget type represents the widget from which the event to be handled by the event handler came. The argument with the XPointer type is a pointer to data which is provided when the event handler is installed in table 207 and is then passed to the event handler when the event handler is invoked. XEvent* is the type of the formal argument which represents the event which is to be handled by the event handler. Boolean* is the type of a formal argument which represents a pointer to a Boolean value which indicates whether event handlers following this one are to be called to handle the event.

To install an event handler in the X Window System, one must do the following:

Write a function which matches the prototype. Often, this function does nothing more than encapsulate the real event handler code; and Call an installation function to install the function.

An example of a function which matches a prototype and encapsulates the real event handler is the following function named eventhandlerproc. That function consists of one line of code, which calls the function f().

```
XtEventHandler
eventhandlerproc (Widget widget, XtPointer p,
            XEvent *e, Boolean *c)
{
    f (widget, "this case", c);
}
```

The invocation f (widget, "this case", c); has actuals corresponding to only two of the formals for eventhandlerproc.

eventhandlerproc must now be installed in callback table 207 using the installation function.

```
XtAddEventHandler (w, eh → event_mask,
            eh → nonmaskable,
            eventhandlerproc,
            data);
```

Here, the actual arguments contain the information required for an entry in callback table 207 for eventhandlerproc. w indicates the widget from which the callback is being made; eh→event_mask indicates how the event mask in the entry is to be set. The event mask indicates which events are to result in the invocation of eventhandlerproc. eh→nonmaskable is a Boolean value which indicates whether the function is to be invoked when one of a class of nonmaskable events occurs. eventhandlerproc is a pointer to the function to be invoked when the event occurs. data is a pointer to the data which is to be provided when the event handler to which the entry in table 207 belongs is invoked. Further details of the above process of writing and installing an event handler using the X Toolkit may be found in Paul J. Asente and Ralph W. Swick, *X Window System Toolkit, the Complete Programmer's Guide and Specification*, Digital Equipment Corporation, 1990

When an event signal (for example, a click of a button) arrives from mouse 203, system-level handler 205 determines the location of the mouse pointer in the display at the time of the event signal, and determines from the location which window the pointer is in, and consequently, which widget must deal with the signal. System-level handler 205 then uses the widget and the signal to locate an entry in callback code table 207 for an event handler for that widget and that signal. System-level handler 205 then invokes the event handler using the callback info 211 as the actual arguments for the event handler. In the X Window environment, callback info 211 includes at least a pointer to the widget, an indication of the signal 204 to which system level handler 205 is responding, and the user data which was placed in callback code table 207 when the event handler was installed.

In Xtent, the techniques described in the overview of the invention make it possible to omit writing a function such as eventhandlerproc, which exists only to specify the relationship between the formals required by the X toolkit and the actuals of the function f, and instead to specify the relationship directly when adding an entry for the function f to callback code table 207. An example of the way this is done in Xtent is the following:

```
^(w).Xt_AddEventHandler: (^(eh.event_mask),
^(eh.nonmaskable),
.Xtf: (^(%event.widget), "this case",
                %event.continue-to-dispatch))
```

When this Xtent statement is interpreted, the callback function definition and the invocation of XtAddEventHandler required by the X Toolkit are automatically produced by the Xtent interpreter.

Some comments regarding the syntax of Xtent are in order here. Xtent regards widgets as objects, and X Toolkit functions such as XtAddEventHandler are treated as object attributes. The notation ^(<name>) specifies the value represented by the name. Thus, ^(w) is the widget for which the Xt_AddEventHandler attribute is being invoked to add an entry for an event handler to event handler table 207 and is equivalent to the w first argument in the X Tools version of Xt_AddEventHandler. The remaining arguments are represented in Xtent by the items in parentheses following Xt_AddEventHandler: Of particular interest here is the following, which replaces the pointer to the event handler:

```
.Xtf: (^(%event.widget), "this case",
                %event.continue-to-dispatch))
```

.Xt<function name> specifies the function name; the names in parentheses specify the actual arguments. The two names that begin with % are callback information names defined by the Xtent interpreter. Thus, the symbol table used by the Xtent interpreter always contains definitions of %event.widget and %event.continue-to-dispatch. As indicated in the overview of the invention, these definitions have global scope, but the values represented by the names have local scope, and are thus separately instantiated for each execution of a callback function which takes them as actual arguments. The preferred embodiment does not do garbage collection on the instantiations; other embodiments may however remove the instantiations after all callback code for a signal has executed.

For example, %event.widget is globally defined to mean the widget for which the present execution of the event handler was begun, and %event.continue-to-dispatch is globally defined to mean the Boolean value which indicates in the present execution of the event handler whether further event handlers may be invoked for the event which produced the present execution. The use of the callback information names makes it possible to completely describe the actual arguments for f when adding that event handler to table 207. Defining and installing an event handler is thus substantially simpler in Xtent than when the X Toolkit is used directly and is also easier to understand, since all of the essential information about the function is contained in the Xtent statement which installs the function.

Conclusion

The foregoing Detailed Description has disclosed to one of ordinary skill in the art how callback information names may be used to specify actual arguments for callback routines. While the preferred embodiment is the best mode of practicing the invention presently known to the inventor, other embodiments may be constructed which employ the principles of the invention. For example, the preferred embodiment is employed in the context of the X Window System; however, the principles of the invention may be employed for callback-style programming in any area of application. Further, though the principles of the invention are particularly advantageous in callback-style programming, they are not limited to such programming. For example, if a number of functions use the same set of actual arguments, it may simplify the writing of invocations of those functions and make the program more understandable if "well-known" names like the callback information names of the present invention are used for the actual arguments and there is an actual argument specifier someplace in the program which shows how these well-known names are used as actual arguments.

All of the above being the case, the foregoing Detailed Description is to be understood as being in every respect illustrative and exemplary, but not restrictive, and the scope of the invention disclosed herein is not to be determined from the Detailed Description, but rather from the claims, and the claims are to be given the full breadth permitted by the law.

What is claimed is:

1. Code generation apparatus used in a computer system to generate machine-executable instructions, the code generation apparatus including at least a text written in a programming language, the text including a definition of a function, and means for generating the machine-executable instructions from the text, the code generation apparatus having the improvement comprising:

in the text, a name which has global scope in the text and specifies a value which is separately instantiated for each execution of the function and a use specification which specifies how the name is used in an execution of the function; and in the means for generating the machine-executable instructions, means responsive to the name for making a definition thereof which indicates that the name has global scope and specifies a value which is separately instantiated for each execution of the function; and means responsive to the definition and to the use specification for generating the machine-executable instructions for the function such that when the function is executed, a separate instance of the value represented by the name is created and that instance is used in the execution as specified by the use specification.

2. The apparatus set forth in claim 1 wherein:

the instructions are callback code; and the name represents an actual argument for the callback code.

3. The apparatus set forth in claim 2 wherein:

there is a plurality of callback codes which are specified in a list thereof;

and there is an operation for adding a callback code to the list thereof; and the use specification is part of a specification of the operation for adding the callback code to the list thereof.

4. The apparatus set forth in any of claims 1, 2, or 3 wherein:

the means for generating instructions is a compiler.

5. The apparatus set forth in any of claims 1, 2, or 3 wherein:

the means for generating instructions is an interpreter.

6. A method used in a computer system to generate machine-executable instructions from a text, the text being written in a programming language, defining at least a function, and including a name which has global scope in the text and specifies a value which is separately instantiated for each execution of the function and a use specification which specifies how the name is used in an execution of the function and the method comprising the steps performed in the computer system of:

responding to the name by making a definition thereof which indicates that the name has global scope and specifies a value which is separately instantiated for each execution of the function; and responding to the definition and to the use specification by generating the machine-executable instructions for the function such that when the function is executed, a separate instance of the value represented by the name is created and that instance is used in the execution as specified by the use specification.

7. The method set forth in claim 6 wherein:

the instructions are callback code; and the step of making a use specification specifies how the name is to be used to represent an actual argument for the callback code.

8. The method set forth in claim 7 wherein:

there is a plurality of callback codes which are specified in a list thereof; and there is operation for adding a callback code to the list thereof; and the step of specifying a use is done as part of a specification of the operation for adding the callback code to the list thereof.

9. The method set forth in any of claims 6, 7, or 8 wherein:

the method is practiced in a compiler.

10. The apparatus set forth in any of claims 6, 7 or 8 wherein:

the method is practiced in an interpreter.

* * * * *